No. 895,470. PATENTED AUG. 11, 1908.
A. H. KEE.
KAFIR CORN HEADER.
APPLICATION FILED JULY 19, 1907.
2 SHEETS—SHEET 1.
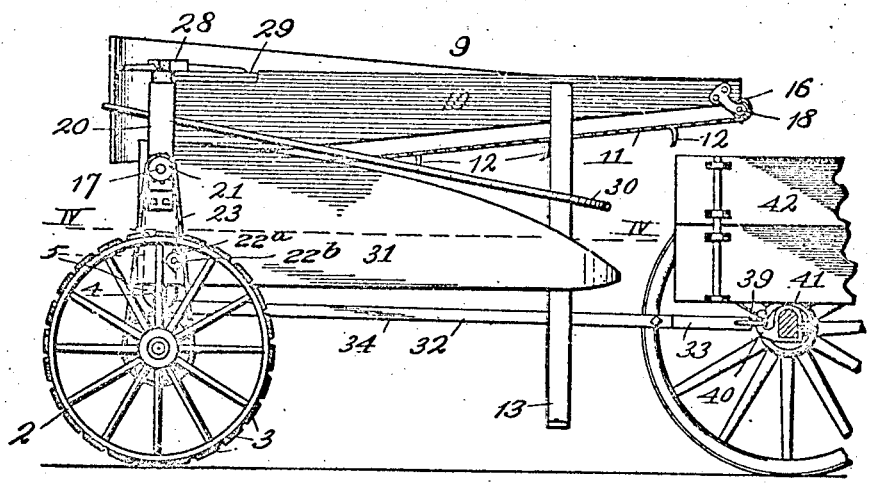
Fig. 1.
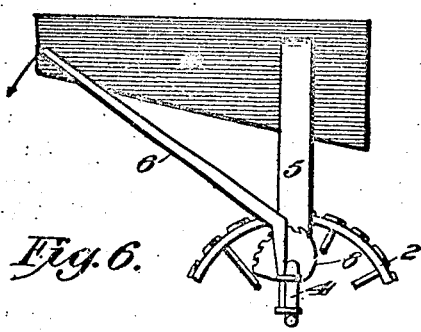
Fig. 6.
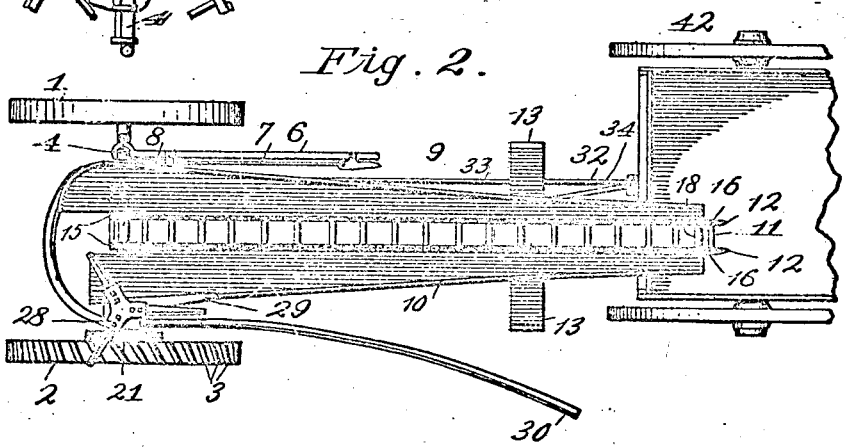
Fig. 2.
Fig. 5.
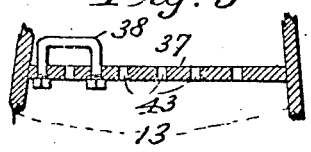
Witnesses:
R. E. Hamilton
E. A. Cahill
Inventor,
Arthur H. Kee
By F. G. Fischer
Atty.

UNITED STATES PATENT OFFICE.

ARTHUR H. KEE, OF COY, OKLAHOMA.

KAFIR-CORN HEADER.

No. 895,470.

Specification of Letters Patent.

Patented Aug. 11, 1908.

Application filed July 19, 1907. Serial No. 384,505.

*To all whom it may concern:*

Be it known that I, ARTHUR H. KEE, a citizen of the United States, residing at Coy, in the county of Woodward, Oklahoma, have invented certain new and useful Improvements in Kafir-Corn Headers, of which the following is a specification.

My invention relates to improvements in Kafir-corn headers; and my principal object is to provide a simple machine of light draft which may be hauled through the field behind a wagon for the purpose of gathering and heading the corn and loading said heads into the wagon.

The machine is arranged to cut one row at a time and may be raised or lowered to accommodate fields of corn of different heights.

Other objects will hereinafter appear, and in order that the invention may be fully understood reference will now be made to the accompanying drawings, in which:—

Figure 3:
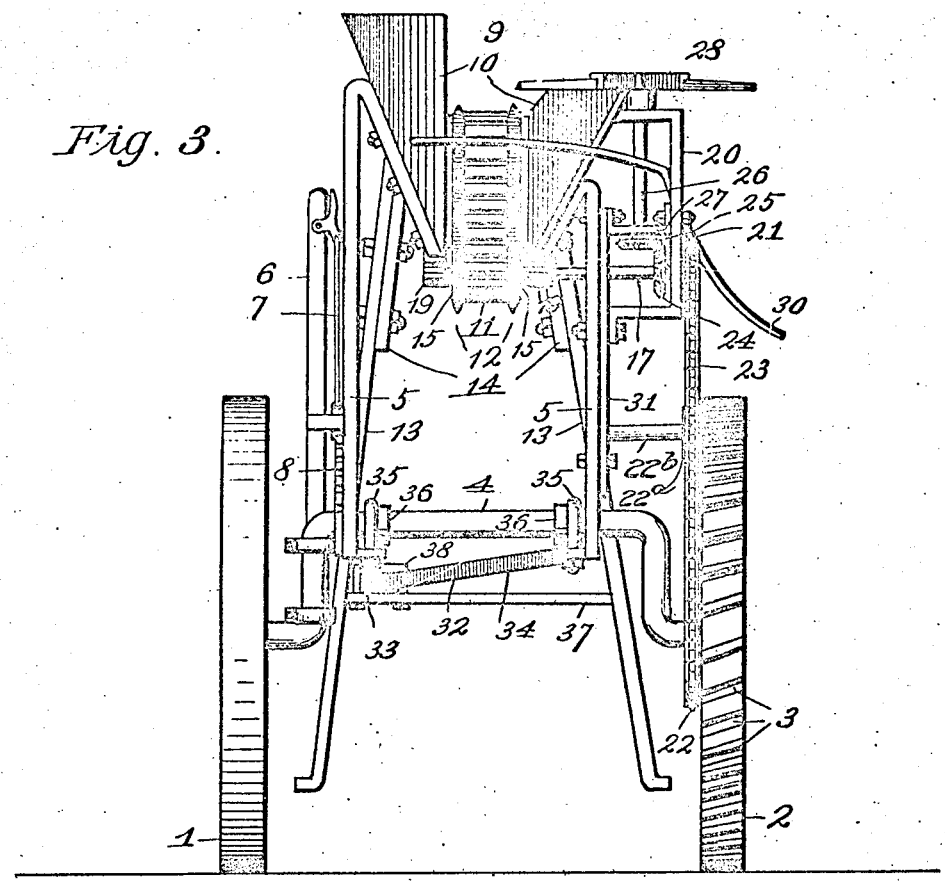
Figure 4:
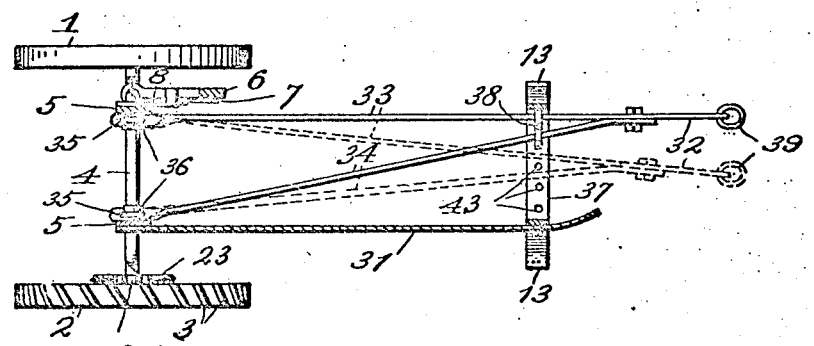

Figure 1 represents a side elevation of the machine in an operative position. Fig. 2 is a plan view of the same. Fig. 3 is an enlarged rear elevation. Fig. 4 is a horizontal section on line IV—IV of Fig. 1. Fig. 5 is a detail front elevation showing the manner in which the tongue is secured to a cross-bar employed in carrying out the invention. Fig. 6 is a broken side elevation of the machine showing the lever for raising and lowering the same.

In carrying out the invention I employ a pair of ground wheels 1 and 2, which latter has peripheral shoes 3 to prevent it from slipping while driving certain mechanism hereinafter described. Said wheels are mounted upon a crank-axle 4 rockingly mounted in the lower ends of a pair of arms 5 and provided with a hand-lever 6 having a latch 7 adapted to engage any of the notches in a segment 8 secured to one of the arms 5.

9 designates a conveyer consisting of a trough 10 tapering toward its forward end and a sprocket-chain 11, provided with spurs 12. Trough 10 is secured at its rear end to arms 5 and at its forward portion to a pair of supporting-legs 13 and a pair of braces 14, which latter are secured at their lower ends to the supporting-legs. Chain 11 runs around sprocket-wheels 15 and 16 fixed upon shafts 17 and 18 at the rear and front ends of the trough, respectively. Shaft 17 is journaled in boxes 19 and a bracket 20, as clearly shown in Fig. 3. Shaft 17 is driven by wheel 2, through the instrumentality of a sprocket-wheel 21 fixed to said shaft, a sprocket-wheel 22 fixed to the hub of wheel 2, and an endless sprocket-chain 23 running around said sprocket-wheels. Shaft 17 is also provided with a fixed bevel gear wheel 24 which drives a bevel gear wheel 25, fixed to the lower end of a short vertical shaft 26 journaled in bracket 20, and a cross-piece 27. When the machine is lowered chain 23 is kept taut by an idler 22ª journaled upon a stub-shaft 22ᵇ projecting from the adjacent arm 5.

28 designates a rotary cutter fixed to the upper end of shaft 25 and adapted to coöperate with a blade 29 in severing the heads of the Kafir corn from the stalks. Blade 29 is fixed to one side of the trough, and the rotary cutter overlaps said blade and side so that it will cast the heads into the trough as it severs them from the stalks. The heads are directed to the cutter and the blade by a gathering-arm 30 and a shield 31, the forward ends of which are spread in opposite directions in order to engage the stalks. Arm 30 extends backwardly and closes the rear end of trough 10, while shield 31 is secured to the adjacent arm 5 and supporting-leg 13 and is of sufficient width to prevent the corn from bending inwardly and becoming entangled with the sprocket-chain 11.

32 designates an adjustable tongue consisting of two bars 33 34 pivotally secured at their rear ends to the lower ends of a pair of eye-bolts 35, pivotally engaging the arched portion of axle 4 and held apart by collars 36 secured to said axle. The forward portion of the tongue normally rests upon a transverse bar 37 secured to the lower portion of legs 13 and provided with a U-bolt 38 loosely engaging the tongue so that it will not interfere with raising and lowering the machine for corn of different heights. The upper portion of said U-bolt normally rests upon the tongue, and in conjunction with the transverse bar 37, controls the forward portion of the machine and prevents it from unduly tipping up or down.

The forward end of bar 33 is provided with a link 39 adapted to engage a hook 40 secured to the rear axle 41 of the wagon 42. Bar 37 is provided with holes 43 so that the U-bolt and the tongue may be either secured to one side or the center of the bar as indicated by full and dotted lines Fig. 4.

In practice the knife side of the machine is adjusted to the right of the wagon, as shown in Fig. 2, so that the wagon will not run over the row of corn being cut. Then as the machine is drawn forward arm 30 and shield 31 will direct the stalks to the rotary knife, which in conjunction with blade 29, will sever the heads and cast them upon chain 11 in trough 10 where they are engaged by the prongs and carried thereby to the forward end of the conveyer from whence they are discharged into the wagon. Should the corn in one field be lower than that in another, the machine may be readily lowered by drawing lever 6 forward and thus lowering the arched portion of the crank-axle 4.

Preparatory to hauling the machine from one field to another or upon the road, the draft is centralized by adjusting bolt 38 and the tongue to the center of bar 37, as shown by dotted lines Fig. 4.

Having thus described my invention, what I claim is:—

1. In a machine of the character described, an axle, ground wheels mounted thereon, arms extending upwardly from said axle, a trough secured to said arms, sprocket-wheels mounted in the ends of said trough, an endless chain connecting said sprocket-wheels, a blade fixed to the trough, a rotary cutter which coöperates with said blade, and gearing driven by one of the ground wheels for driving the rotary cutter and the sprocket-wheels and chain, substantially as described.

2. In a machine of the character described, a crank-axle, ground wheels mounted thereon, a lever for raising and lowering the arched portion of the axle, a conveyer, a blade fixed to one side of said conveyer, a rotary cutter overlapping said blade and side of the conveyer, means for directing the corn to the rotary cutter, and gearing driven by one of the ground wheels for driving the rotary cutter and the conveyer, substantially as described.

3. In a machine of the character described, a crank axle, ground wheels mounted thereon, means for raising and lowering the arched portion of the axle, a conveyer, a blade fixed to said conveyer, a rotary cutter overlapping said blade, gearing driven by one of the ground wheels for driving the rotary cutter and the conveyer, and an adjustable tongue connected to the axle, substantially as described.

4. In a machine of the character described, an axle, ground wheels mounted thereon, a conveyer suitably mounted at its rear end upon the axle, a blade fixed to one side of the conveyer, a rotary cutter overlapping said blade, means for directing the corn to the cutter, gearing driven by one of the ground wheels for driving the rotary cutter and the conveyer, and a pair of supporting legs secured to the forward portion of the conveyer, substantially as described.

5. In a machine of the character described, a crank axle, ground wheels mounted thereon, a conveyer suitably mounted at its rear end upon the axle, a blade fixed to one side of the conveyer a rotary cutter overlapping said blade, means for directing the corn to said cutter, gearing driven by one of the ground wheels for driving the rotary cutter and the conveyer, a pair of supporting legs connected to the forward portion of the conveyer, a transverse bar secured to the supporting legs, and a tongue pivotally connected to the axle and adjustably secured at its forward portion to the transverse bar, substantially as described.

6. In a machine of the character described, an axle, ground wheels mounted thereon, a conveyer suitably mounted at its rear end upon the axle, a blade fixed to one side of the conveyer a rotary cutter overlapping said blade, means for directing the corn to the cutter, gearing driven by one of the ground wheels for driving the rotary cutter and the conveyer, supporting legs secured to the forward portion of the conveyer, a transverse bar secured to said supporting legs, a U-bolt adjustably secured to said transverse bar, and an adjustable tongue extending between the transverse bar and the U-bolt and pivotally connected to the axle, substantially as described.

7. In a machine of the character described, an axle, ground wheels mounted thereon, arms extending upwardly from said axle, a conveyer secured at its rear end to said arms, a rotary cutter overlapping one side of the conveyer, gearing driven by one of the ground wheels for driving the rotary cutter and the conveyer, depending supporting legs secured to the forward portion of the conveyer, a shield connected to one of the arms and one of the supporting legs, and a gathering-arm arranged to one side of the shield and secured to the rear end of the conveyer.

8. The combination with a wagon, of a fastening device secured to the rear axle thereof, a pair of ground wheels, an axle upon which said wheels are mounted, arms extending upwardly from said axle, a conveyer secured at its rear end to said arms, a rotary cutter mounted at one side of said conveyer, gearing driven by one of the ground wheels for driving the rotary cutter and the conveyer, and a tongue having means adapted to engage the fastening device on the wagon axle.

In testimony whereof I affix my signature, in the presence of two witnesses.

ARTHUR H. KEE.

Witnesses:
W. E. McCUNE,
CARY HENRY.